2,845,083

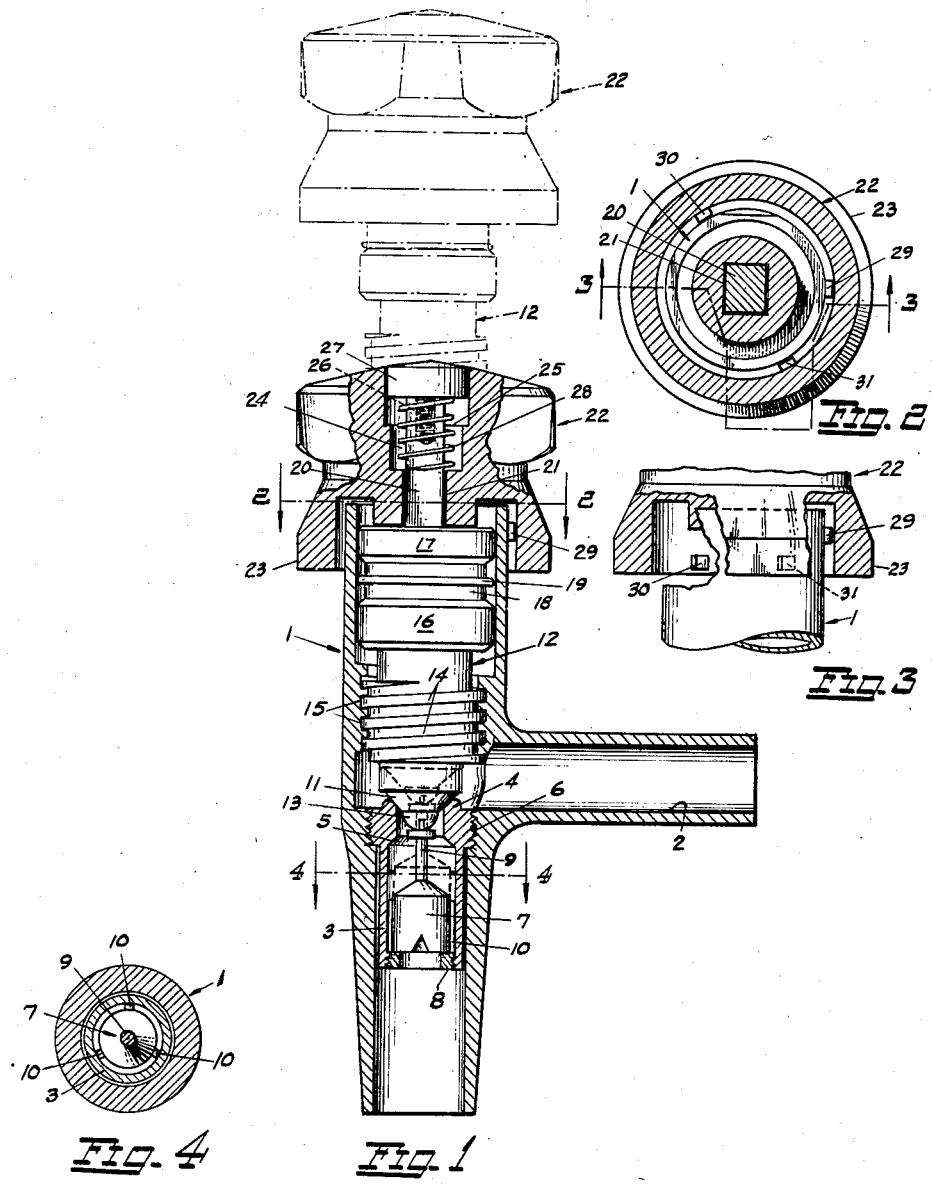

FLUID CONTROL VALVE WITH SUPPLEMENTAL CHECK VALVE

Clinton L. Graybill, Superior, Mont.

Application February 10, 1955, Serial No. 487,265

1 Claim. (Cl. 137—329.2)

This invention relates to improvements in fluid pressure control valves.

It is one of the principal objects of the invention to provide a valve of this character which is entirely automatic in closing off the flow of fluid to a fixture when the fixture is opened beyond its normal open position in accordance with my invention.

A further object is to provide a valve wherein its several parts are readily accessible for repair, adjustment or replacement without the use of any tools whatever, and which can be disassembled and reassembled in a minimum amount of time.

A further object is the provision of a valve of this kind which is of simple, efficient, durable, and inexpensive construction comprising a minimum number of parts made of simple castings and a minimum amount of machine work.

The foregoing and other objects will appear as my invention is more fully hereinafter described in the following specification, illustrated in the accompanying drawing and finally pointed out in the appended claim.

In the accompanying drawing:

Figure 1 is a sectional side view of a valve made in accordance with my invention.

Figure 2 is a sectional plan view taken along the line 2—2 of Figure 1.

Figure 3 is a fragmentary sectional view taken approximately along the line 3—3 of Figure 2.

Figure 4 is a sectional plan view taken along the line 4—4 of Figure 1.

Referring now more particularly to the drawing:

The valve housing, generally indicated by reference numeral 1 in Figure 1, is in the form of an elongated hollow cylinder formed integral with or provided with an outlet 2 and adapted at its bottom inlet end for attachment, in any approved manner, to a source of fluid under pressure. The outlet is in open communication with the interior of the housing 1 just above a hollow check valve housing 3 formed into an external valve seat 4 on its top end and an internal valve seat 5. The check valve housing is externally threaded at its top end and thereby removably secured to the interior of the housing 1 at the inlet end thereof by means of threads 6 formed therein. A check valve 7 is slidably mounted within its housing 3 and retained therein by a threaded retaining ring 8. The top end of the check valve which cooperates with the valve seat 5 is provided with a stem 9. The check valve is of less diameter than the inside diameter of its housing to permit passage of fluid therethrough and is formed with longitudinal ridges 10 for stabilizing its vertical movement within its housing.

Cooperating with the external valve seat 4 on the top end of the check valve housing is a valve 11 in the form of a resilient washer or the like, removably secured to the bottom end of a valve body 12 preferably by a round head screw 13, the head of which, as shown, bears against the top end of the stem 9 on the check valve at all times during normal opening and closing operations of the valve 11. The valve body 12 is rotatably mounted for reciprocal movement within the valve housing 1 by matching acme threads 14 and 15, respectively, and its opposite end is enlarged in diameter as at 16 and 17 to a working rotatable and slidable fit within the upper end of the valve housing 1. Within the groove 18 formed between the enlargements 16 and 17 I provide an annular seal in the form of an O-ring 19 or the like, adapted to roll with a minimum amount of wear lengthwise of the groove during normal opening and closing manipulation of the valve 11.

The top end of the valve body 12 is formed with a vertical shaft 20 of rectangular shape in cross-section for slidable engagement with a rectangular opening 21 formed in a handwheel 22 having a skirt portion 23. The top end of the shaft terminates within a bore 24 which is shouldered as at 25. To the top end of the shaft 20 I attach a screw 26 having a cylindrical head 27 disposed within the bore above the shoulder. Also within the bore is a compression spring 28 whose top end bears against the underside of the screw head and whose bottom end bears against the bottom end of the bore to normally maintain the handwheel in firm contact with the top end of the valve body 12 as shown.

At the top end of the valve housing 1 I provide a fixed limit stop 29 for cooperation with either of two diametrically opposed limit stops 30 and 31 formed on the interior of the skirt portion 23 of the handwheel. It will be noted in Figure 3 that when the valve 11 is closed as in Figure 1 the limit stops 30 and 31 are in a plane below that of the fixed limit stop 29 so that the handwheel will be free to rotate in a counter-clockwise direction as the limit stop 30 spirals upwardly into abutment with the fixed limit stop 29 at which time the valve 11 will be fully open as shown in dotted lines in Figure 1. It will also be noted that fluid pressure acting on the check valve 7 will cause the check valve to follow the valve 11 up to the dotted line position shown.

When it is desired to remove the valve body 12 in its entirety from the valve housing as shown in broken lines in Figure 1 it is merely necessary to pull upwardly on the handwheel against the spring 28 to clear the limit stops 30 and 29 whereupon the valve body may be rotated out of threaded engagement with the interior of the valve housing.

The limit stop 31 is provided so that it will assume the position of the stop 30 in the event the handwheel is rotated through 180 degrees from the position shown when attaching it to the shaft 20 of the valve body 12.

While I have shown a particular form of embodiment of my invention I am aware that many minor changes therein will readily suggest themselves to others skilled in the art without departing from the spirit and scope of the invention.

Having thus described my invention what I claim as new and desire to protect by Letters Patent is:

A valve of the character described comprising in combination a hollow cylindrical valve housing internally threaded for a portion of its length and having a top and bottom valve seat formed on the interior thereof and an outlet opening adjacent one of said valve seats, a manually actuated cylindrical valve body externally threaded for a portion of its length at one of its ends and thereby threadedly mounted within the valve housing for rotatable and reciprocal movement with respect thereto and for cooperating with said top valve seat, a valve for said bottom valve seat slidably mounted within the valve housing and in abutting contact with said manually actuated valve and actuated into a closed position by pressure of fluid within the valve housing upon opening said manually actuated valve a predetermined degree, the opposite end of said valve body being of an outside diameter substantially equal to the inside diameter of said cylindrical valve housing and having an annular groove formed therein of a width equal to at least one-half the length of said threaded portion of the valve body, an O-ring disposed within said annular groove and in rolling contact with the peripheral surface of said groove and with the inner peripheral surface of said cylindrical housing whereby a rolling seal will be provided between and in minimal frictional contact with both of said peripheral surfaces throughout the operative range of said valve body, a limit stop formed externally of the valve housing near its upper end, a handwheel slidably and yieldingly attached to the manually actuated valve and having an annular skirt portion surrounding the upper end of the valve body in concentric spaced relation thereto, a limit stop formed on the inner periphery of the skirt portion of said handwheel and adapted for contact with said limit stop on the valve housing upon rotation of the handwheel to open the manually actuated valve, whereby said handwheel can be lifted to clear its limit stop from said limit stop on the valve housing to permit further rotation of the handwheel to thereby disengage the manually actuated valve from its threads to permit removal of the valve body in its entirety from the interior of the valve housing.

References Cited in the file of this patent

UNITED STATES PATENTS

| | | |
|---|---|---|
| 1,089,098 | Winkler | Mar. 3, 1914 |
| 1,499,260 | Stump | June 24, 1924 |
| 1,605,262 | Midgley | Nov. 2, 1926 |
| 1,703,861 | Bohnhardt | Mar. 5, 1929 |
| 2,657,006 | Drow | Oct. 27, 1953 |

FOREIGN PATENTS

| | | |
|---|---|---|
| 10,716 | Great Britain | of 1899 |
| 506,807 | France | of 1920 |
| 905,035 | France | of 1945 |